United States Patent [19]

Rauneker et al.

[11] Patent Number: 4,895,054
[45] Date of Patent: Jan. 23, 1990

[54] MOTOR VEHICLE SWITCHING AND CONTROL DEVICE

[75] Inventors: Josef Rauneker, Ostfildern; Josef Blass, Tamm; Rolland Weller, Salach; Kurt Bessner, Stuttgart, all of Fed. Rep. of Germany

[73] Assignee: Daimler-Benz AG, Stuttgart, Fed. Rep. of Germany

[21] Appl. No.: 289,822

[22] Filed: Dec. 27, 1988

Related U.S. Application Data

[63] Continuation-in-part of Ser. No. 13,059, Feb. 10, 1987, abandoned, and a continuation-in-part of Ser. No. 670,862, Nov. 13, 1984, abandoned.

[30] Foreign Application Priority Data

Nov. 10, 1983 [DE] Fed. Rep. of Germany ....... 3340645

[51] Int. Cl.$^4$ .................. B60K 41/14; B60K 41/28
[52] U.S. Cl. ............................ 74/877; 74/878; 474/1; 192/4 B
[58] Field of Search ............. 74/877, 471 XY, 473 R, 74/473 P, 476, 477, 878; 474/1, 2, 4; 192/4 R, 4 B, 4 C

[56] References Cited

U.S. PATENT DOCUMENTS

| | | | |
|---|---|---|---|
| 2,829,533 | 4/1958 | Ballmer et al. | 74/868 |
| 3,242,758 | 3/1966 | Harris et al. | 74/476 |
| 3,298,239 | 1/1967 | Miyoshi | 474/1 |
| 3,370,485 | 2/1968 | Carawan | 474/1 |
| 3,893,344 | 7/1975 | Dantlgraber et al. | 74/867 |
| 4,301,902 | 11/1981 | Gatsos et al. | 474/1 |
| 4,369,675 | 1/1983 | van Deursen | 74/868 |
| 4,653,345 | 3/1987 | Edwards | 74/473 R |

FOREIGN PATENT DOCUMENTS 1001542 7/1957 Fed. Rep. of Germany.
2442337 3/1975 Fed. Rep. of Germany.
3204891 10/1982 Fed. Rep. of Germany.

Primary Examiner—Leslie A. Braun
Assistant Examiner—David A. Testardi
Attorney, Agent, or Firm—Barnes & Thornburg

[57] ABSTRACT

A switching and control device is provided for a drive assembly used for driving a motor vehicle. This drive assembly is provided with a driving motor having an adjustment element for the power control system and a continuously variable gear change, which is downstream in the power flow. The gear change contains a control device which operates into an adjustment element for the transmission ratio. The drive assembly also includes a reversing gear containing a switching device for switching over between a gear position for forward motion and another gear position for reverse motion. The switching and control device operates with a link between the adjustment element for the power control and the control device and a range selection member which can be switched by a manually operable selection adjustment element. This range selection member can be moved through an N position, for interruption of the drive, into a V position, for forward motion, and out of the V position directly into an additional position which holds the switching device in the gear position for forward motion and links to the switching device and to the control device for the transmission ratio.

10 Claims, 8 Drawing Sheets

MOTOR VEHICLE SWITCHING AND CONTROL DEVICE

BACKGROUND AND SUMMARY OF THE INVENTION

This application is a continuation in part of application Ser. No. 013,059, which was filed on Feb. 10, 1987, now abandoned and was a continuation in part of application Ser. No. 670,862, which was filed on Nov. 13, 1984, now abandoned.

The present invention relates generally to drive assemblies for motor vehicles and, more particularly, to switching and control means for such drive assemblies.

A known drive assembly switching and control means is shown in German Offenlegungsschrift (Unexamined Published Application) No. 3,204,891. This device employs hydraulic aids for the switching and controlling. A manually operable range selection slider provides a P position for applying a parking brake, an R position for reverse motion, an N position to interrupt the driving transmission, an adjoining D position for fast forward motion and an immediately adjacent L position for slow forward motion. The L position is used for increasing a working pressure or force to match the greater drive torques which normally occur during slow motion. In this switching and control device, special measures for achieving a motor braking operation have not been taken.

It is also known, from German Auslegschrift (Examined Published Application) No. 2,442,337, to provide a control device for a motor vehicle drive assembly containing a continuously variable gear change. In this device, a range selection member as such is not manipulated. Rather, the power control of the drive motor, adjustment of the gear transmission and control of a motor braking operation are exclusively effected by the driving pedal which, from a central position for idling operation, can be shifted by stepping on it into an adjustable range for controlling power and gear transmission. In the opposite direction, this driving pedal shifts into an adjustable range for motor braking operation, thereby stepping up the gear transmission.

In German Auslegeschrift (Examined Published Application) No. 1,001,542, another braking device is shown, having a throttle flap arranged as a motor brake in the exhaust pipeline. This throttle flap is synchronously actuated with a blocking latch for blocking a manual gear switching lever.

It is therefore an object of the present invention to provide a drive assembly switching and control device suitable for use in a light utility vehicle.

Another object of the invention is the provision of an inexpensive switching and control device for motor vehicle drive assemblies having a continuously variable gear change.

A further object of the invention is to provide a switching and control device for motor vehicle drive assemblies having simplified handling characteristics, especially with regard to motor braking operation.

Yet another object of the invention is the provision of a control device for motor vehicle drive assemblies which selectively coordinates forward, neutral, and reverse directional switching of the power drive with parking brake and motor braking operations.

These and other objectives of the present invention are attained according to the invention by providing a novel switching and control device for a drive assembly used for driving a motor vehicle. This drive assembly is provided with a driving motor having an adjustment element for the power control system and a continuously variable gear change, which is downstream in the power flow. The gear change contains a control device which operates into an adjustment element for the transmission ratio. The drive assembly also includes a reversing gear containing a switching device for switching over between a gear position for forward motion and another gear position for reverse motion. The switching and control device operates with a link between the adjustment element for the power control and the control device and a range selection member which can be switched by a manually operable selection adjustment element. This range selection member can be moved through an N position, for interruption of the drive, into a V position, for forward motion, and out of the V position directly into an additional position which holds the switching device in the gear position for forward motion and links to the switching device and to the control device for the transmission ratio.

In order to keep costs and constructional effort low and to guarantee ease of handling, especially for controlling a motor braking operation, the link between the adjustment element for the power control and the control device is provided with a detachable coupling. During the transition of the selection adjustment element into the additional position used for achieving motor braking operation, the coupling part connected to the control device is coupled to a control linkage, which comes from the range selection member, for motor braking operation, with the coupling being detached.

Other objects, advantages and novel features of the present invention will become apparent from the following detailed description of the invention when considered in conjunction with the accompanying drawings

Figure 2:
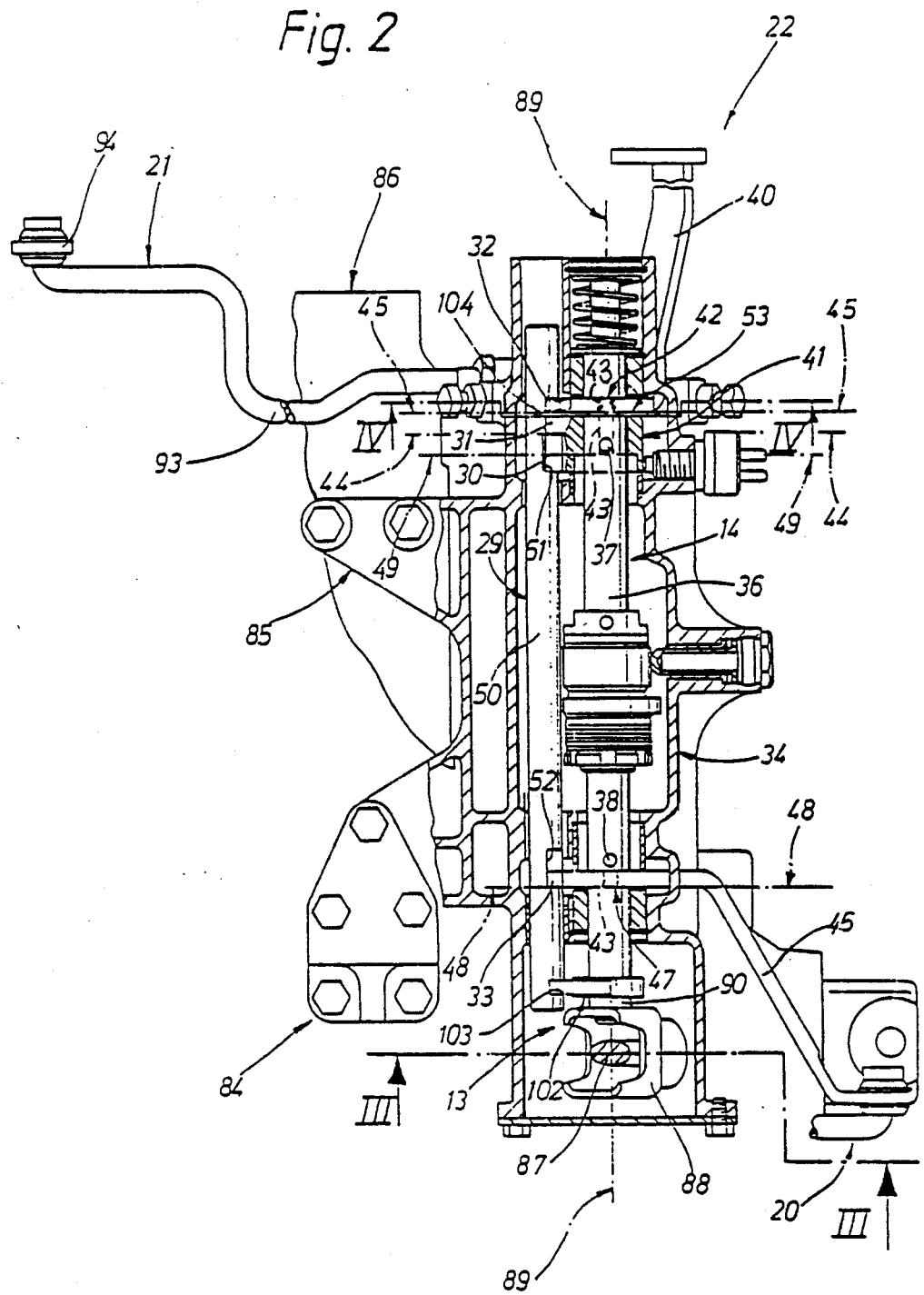
FIG. 2 shows a partially sectioned view, along a horizontal plane, of the switching and control device of the embodiment of the present invention shown in FIG. 1.
Figure 4:
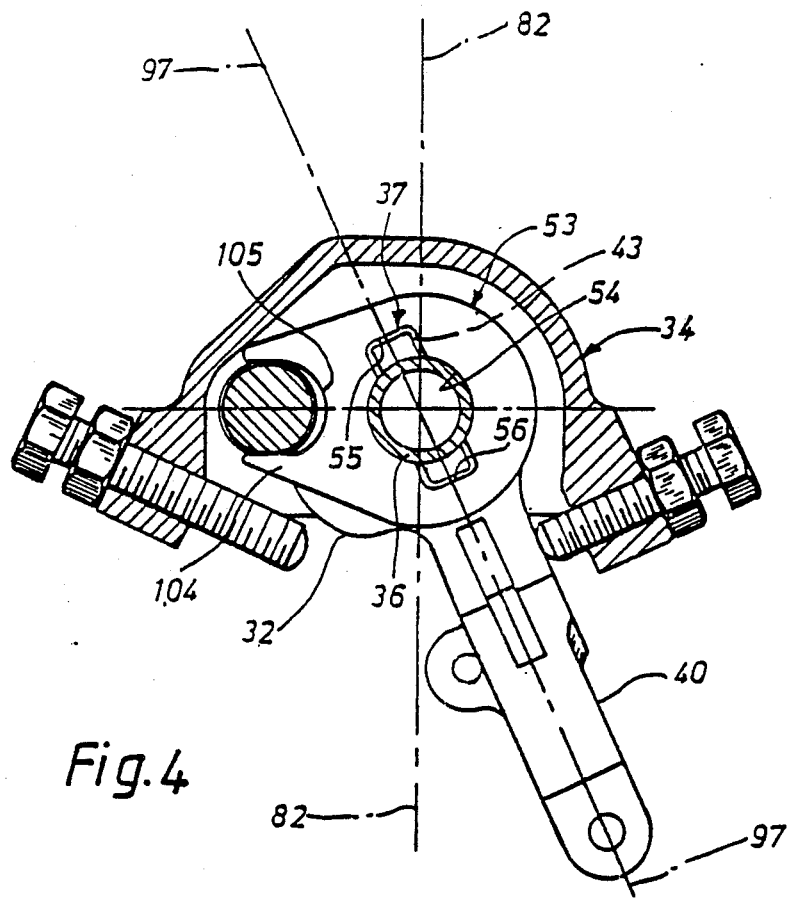
Figure 5:
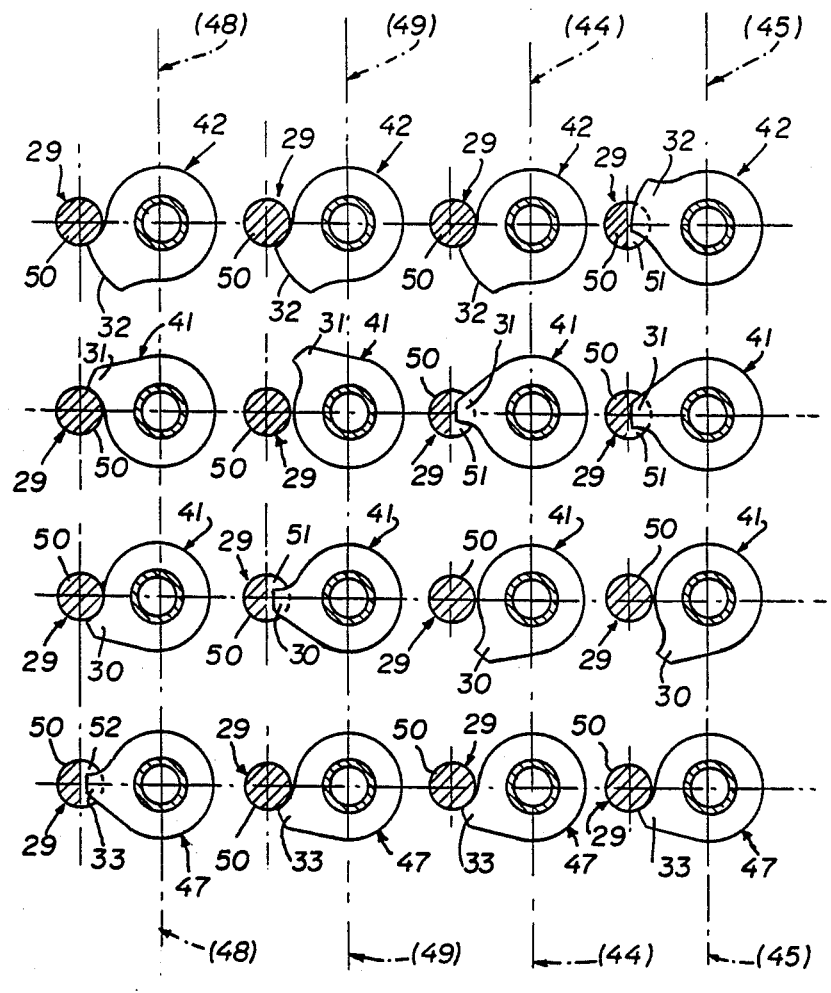
Figure 6:
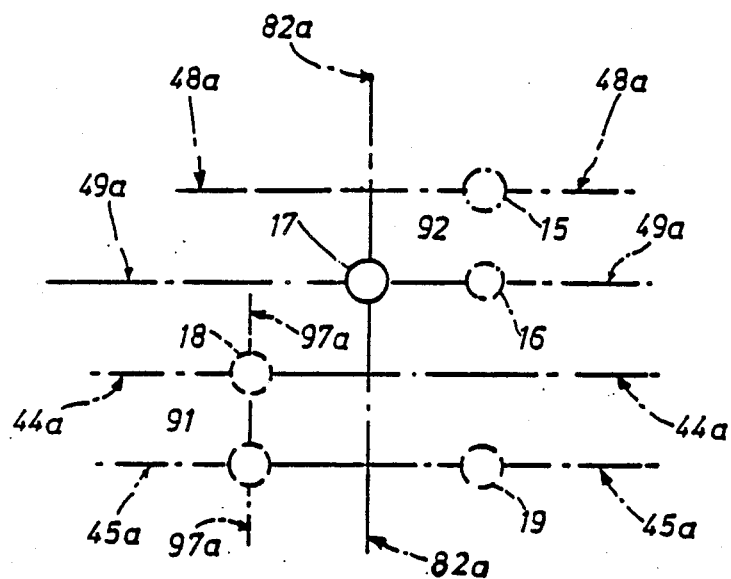
Figure 7:
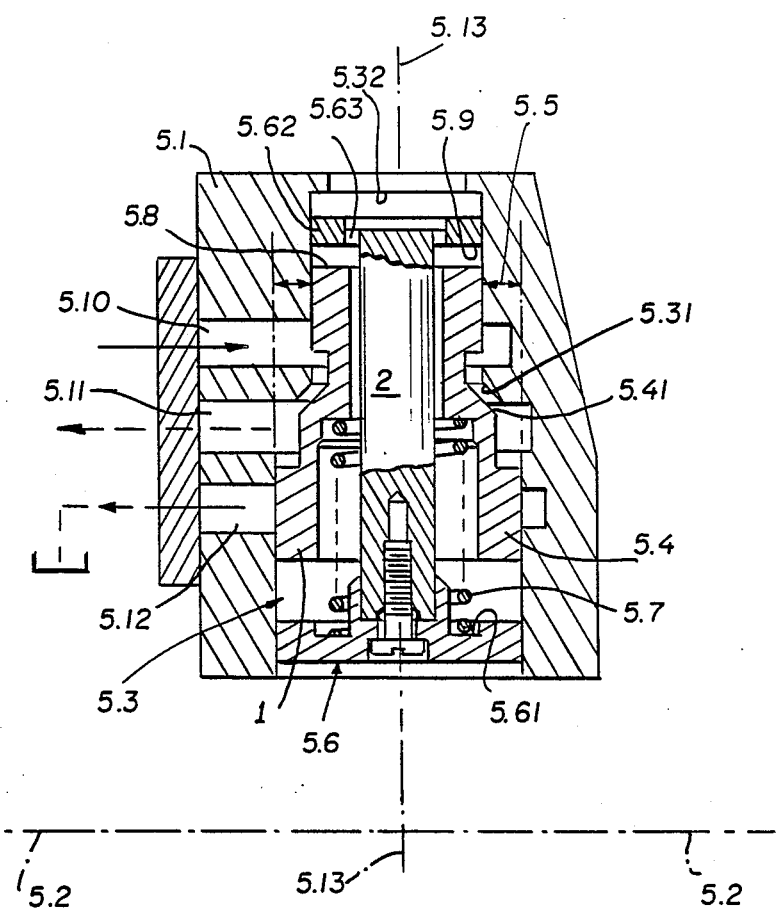
Figure 8:
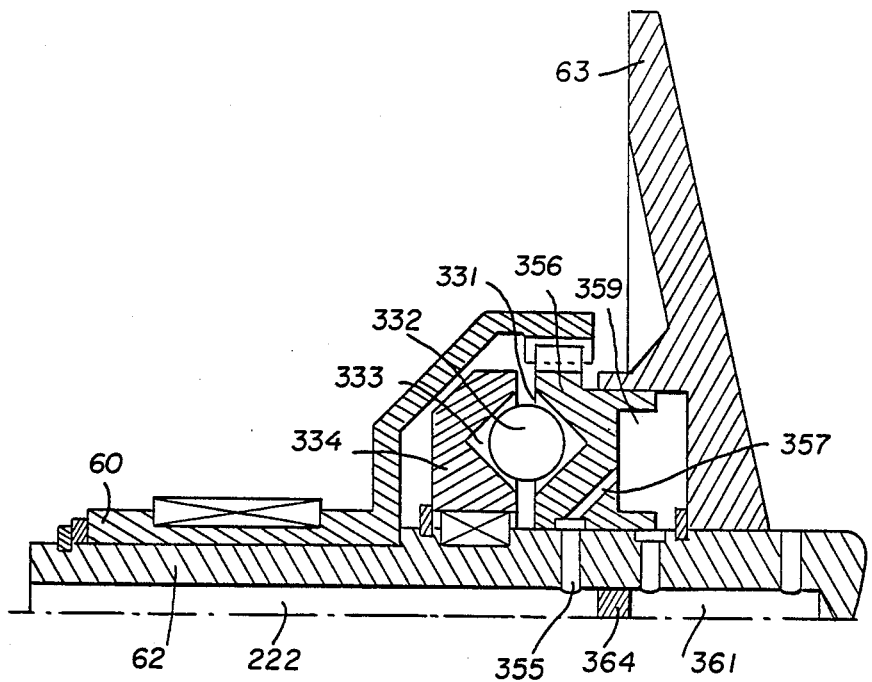

3 shows a partially sectioned view, along line III—III in FIG. 2, of the switching and control device shown in FIG. 2;

FIG. 4 shows a partially sectioned view, along line IV—IV of FIG. 2, of the switching and control device shown in FIG. 2;

FIG. 5 shows an operational diagram of the catches used in the switching and control device shown in FIG. 2;

FIG. 6 shows a switching diagram for the operation of the manual lever of the switching and control device shown in FIG. 2;

FIG. 7 shows a preferred embodiment of a centrifugal govenor for use with the present invention; and FIG. 8 schematically shows a torque signal generating assembly for use with the present invention.

DESCRIPTION OF THE PREFERRED EMBODIMENT

Figure 1:
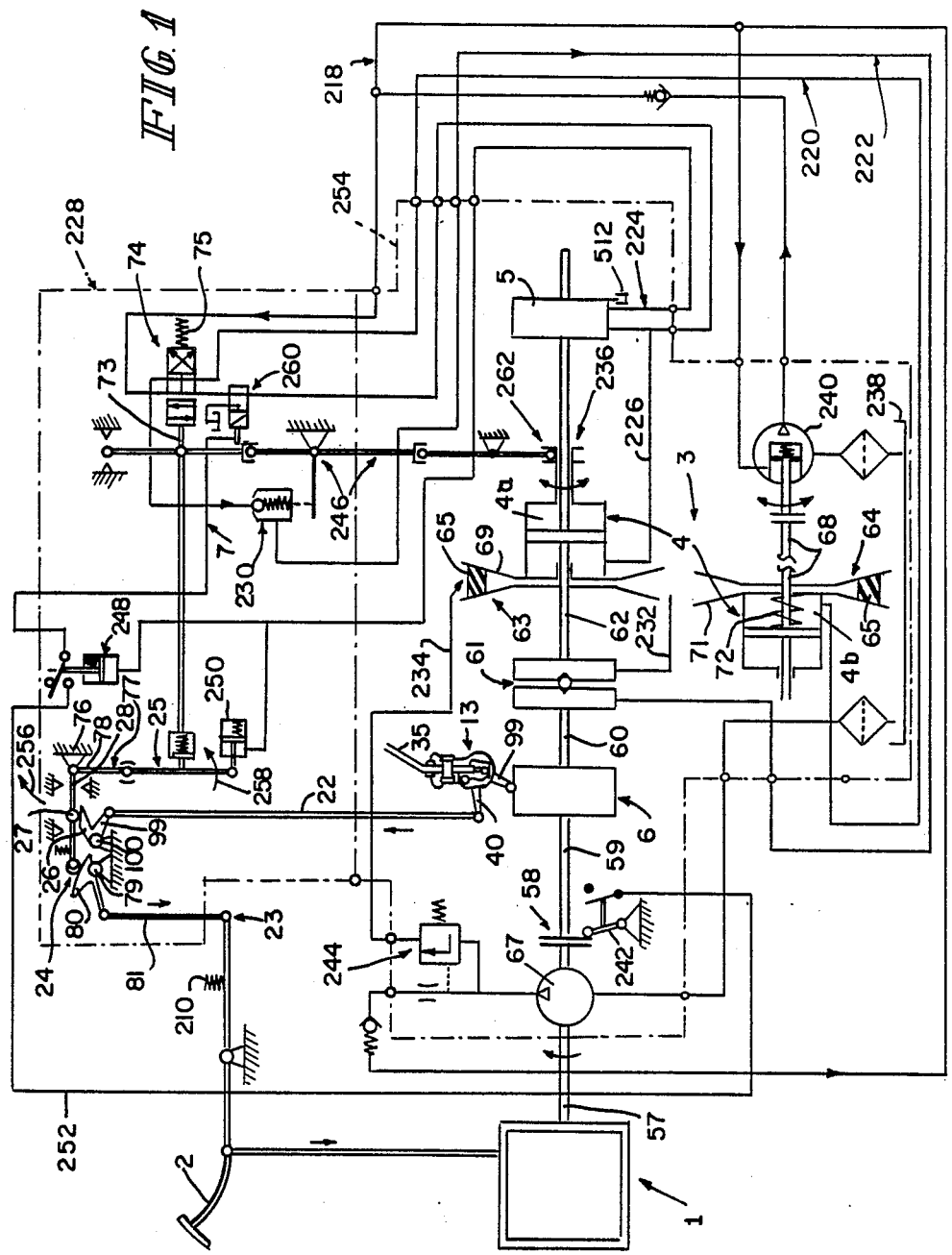
FIG. 1 shows schematically a drive assembly for a motor vehicle having a switching and control device therein constructed according to the principles of the present invention.

FIG. 1, which illustrates a preferred embodiment of the present invention, shows schematically a driving motor 1 whose output power is controllable by a driving pedal 2, which is coupled through a linkage connection 23 to a control system 228, which is schematically shown boxed in dashed line in FIG. 1. The circles on this line represent line connections or line passages leading into or from the housing of control system 5. Similarly, the dashed-solid line 254 represents the transmission case. This control system establishes the auxiliary power of a pressure altering element 4, which adjusts the transmission ratio of a continuously variable gear change 3.

Driving motor 1 includes main shaft 57 which supplies rotational power through starting clutch 58, which is, for example, engaged and disengaged by means of a manual clutch pedal or automatically. Clutch 58 is connected to primary shaft 59 of a reversing gear 6, which is in driving connection, through an intermediate shaft 60 and a torque signal generator assembly 61, with the primary shaft 62 of gear change 3.

German Patent DE No. 30 28 490 discloses a torque signal generator assembly of the type that could be used for torque signal generator 61. Referring to FIG. 8 of the present application (corresponding also to FIG. 3 of DE No. 30 28 490), the torque sensor has two rings 334 and 356 which, via balls 332, are in a torque-transmitting mutual connection with one another. These rings 334 and 356 have respective wedge-shaped recesses 333 and 331 opposite one another for engaging the balls 332.

Ring 334 is non-rotatably connected with the shaft 62. The other ring 356 is connected non-rotatably, but in an axially movable manner, with shaft 60 via a driving bell 327 which is rotatably disposed on the shaft 62 and is non-rotatably connected with the shaft 60.

The ring 356 and the fixed pulley 69a enclose a pressure chamber 359 between them. Chamber 359 is connected with a pressure duct 360 of the shaft 62 on one side and is in an open connection with a pressure duct 358 of the ring 356 on the other side.

A torque dependant control valve is formed by an extension 363 of the ring 356 which controls an annular groove 362 of the shaft 62 communicating to pressure duct 360 as a function of the axial position of ring 356. The axial position of ring 356 is controlled by the torque transmitted between ring 334 and 356 due to the configuration of balls 332 and recesses 331 and 332.

The pressure duct 360 leads to another pressure duct 361 in the shaft 62, a line 232 (see FIG. 1) being connected to this latter pressure duct 361.

The ring 356 has an inner circumferential groove 357, into which the pressure duct 358 leads. The circumferential groove 357 is in a permanent connection with a pressure duct 355 in the shaft 62, the latter pressure duct 355 leading into another pressure duct 338 of the shaft 62, to which pressure duct 338 the pressure line 222 (See FIG. 1) is finally connected.

The coaxial pressure ducts 338 and 361 of the shaft 62 are separated from one another in a pressure-proof manner by means of a separating seal 364.

The higher the driving torque introduced to the ring 356 via the driving bell 327, the more this ring 356, with respect to the other rings 334, as a result of the sloped surfaces of the recesses 331, 333, is twisted as well as axially displaced in the direction of the fixed pulley 69a, so that the control valve 362, 363 throttles the connection between the line 222 and the line 232 to a correspondingly larger extent.

Main shaft 57 is in continuous driving connection with a primary pump 67 that supplies fluid pressure to gear change 3 and control device 5 through the main pressure line 218. A pressure regulator valve 244 sets a constant feeding pressure through the main pressure line 218.

Figure 3:
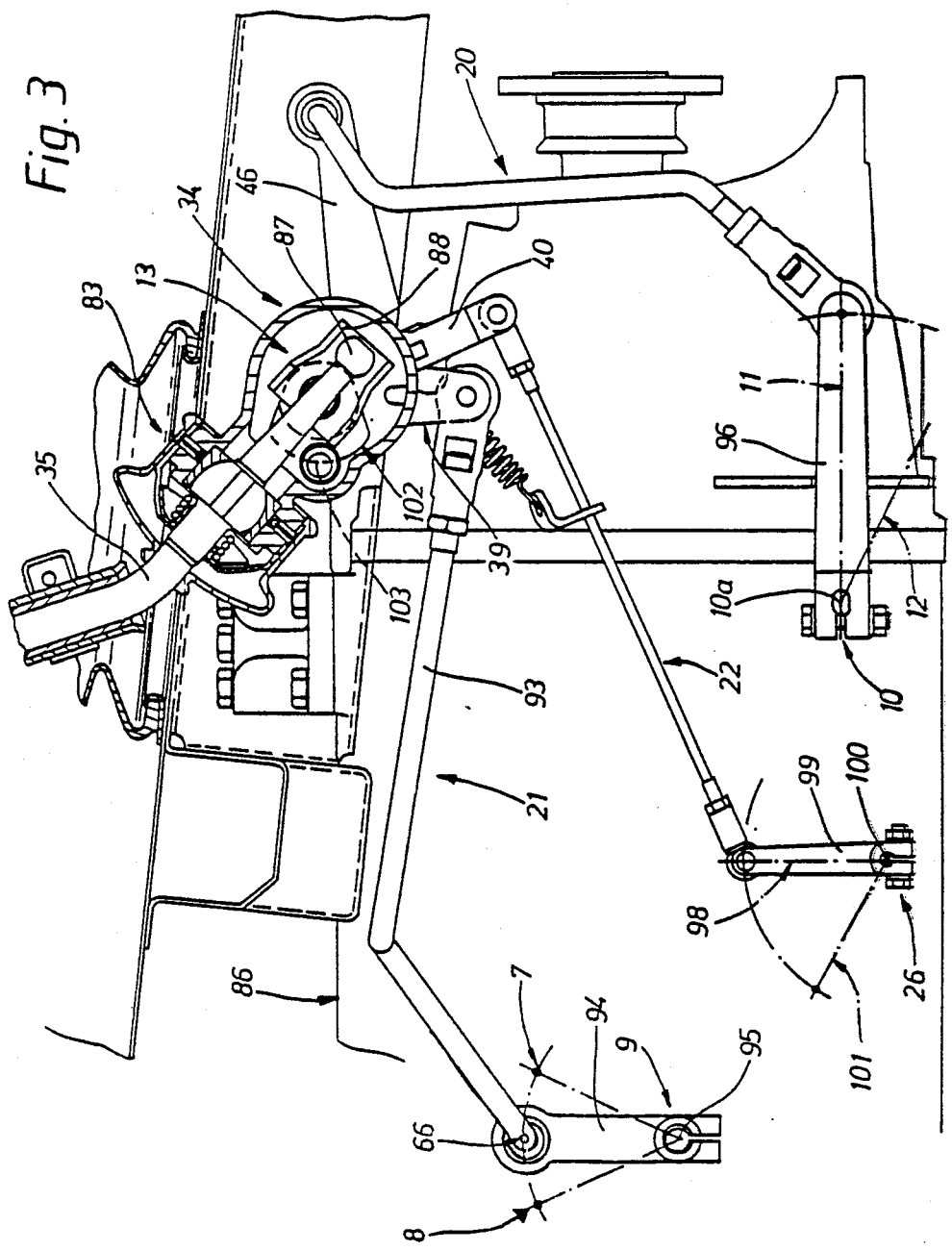

Reversing gear 6 is operably associated with a range selection member 13 and can be switched over by means of a manual lever 35 and switching device 9 (shown in FIG. 3) between V, N and R positions. With reference to FIG. 3, V position 7 is for forward motion in which shafts 59, 60 and 62 shown in FIG. 1 have the same direction of rotation as main shaft 57. In N position 66 the transfer of rotational drive forces between shafts 59 and 60 is interrupted. R position 8 is or reverse motion in which shafts 60 and 62 have the opposite direction of rotation with respect to main shaft 57.

As shown in FIG. 1, shaft 62 drives a pair 63 of V-belt pulleys on the primary side. This pair of pulleys is connected via an endless drive chain 65 to a pair 64 of V-belt pulleys on the secondary side which drives a secondary shaft 68. Secondary shaft 68 is coupled, for example, through a constant gear transmission stage in the form of a planetary wheel gear and via a differential gear, to the motor vehicle wheels (not shown).

Pair 63 of V-belt pulleys on the primary side includes a loose pulley 69, which is connected to pressure adjusting cylinder 4a. Similarly, pair 64 of V-belt pulleys on the secondary side includes a loose pulley 71, which is connected to a pressure adjusting cylinder 4b. Adjusting cylinders 4a and 4b form components of pressure altering element 4 which serves to adjust the transmission ratio. These adjusting cylinders are in fluid connection with a control valve 74 of control device 5 through working pressure lines 226 and 220 respectively. Valve adjusting element 73 of control valve 74 works in conjunction with biasing means 75 and is connected to linkage connection 23 through a detachable coupling 24.

Control valve 74 is a spool valve with a so-called "open" or "floating" center such that in the central valve position—as shown in FIG. 1—all four lines are connected with one another. When the valve 74 is directed into one or the other direction from the center position, of the two valve passages that are each symbolized by an arrow, one is more or less opened wider, which the other valve passage is more or less throttled.

Coupling 24 includes an angle lever 77, which is hinged at a stationary pivot 76, and a control cam 80, which is pivoted around a stationary pivot axle 79. Cam 80 is also connected via an intermediate linkage 81 through linkage connection 23 to driving pedal 2. Angle lever 77 includes lever arm 28, which is actuable by cam 80. Angle lever 77 also includes lever arm 78 through which it is connected to a control part 25, which leads to valve adjusting element 73, of control device 5.

From the range selection member 13, a linkage 22 (connected to a rocking lever 40) leads to a braking control cam 26. For a motor braking operation, braking control cam 26 actuates a cam 27 provided at the lever arm 28. The braking control cam 26 is rotatably fixed on a braking control shaft 100 which is disposed in the proximity of the coupling 24.

As shown in FIG. 3, manual lever 35 is arranged to be centrally pivotable at pivot joint 83 in a gear casing 34.

This casing is, for example, secured by screw mountings 84 and 85 at gear housing 86 of gear change 3. As shown in FIG. 2, the lower end of manual lever 35 ends in a ball pin 87 which is connected through a joint 88 to a shaft end 90 of a selection shaft 36. This selection shaft is supported to be rotatable and displaceable with respect to its axis 89—89 within gear casing 34.

Selection shaft 36 forms a portion of selection element 14 of range selection member 13. The range selection member further includes rocking levers 39, 40 and 46 and their respective driving collars 41, 42 and 47 which are arranged about selection shaft 36 in such a manner that the driving collars are supported to be rotatable and axially displaceable with respect to selection shaft 36 while remaining substantially axially fixed with respect to gear casing 34.

Each of driving collars 41, 42 and 47 is, for example, provided with one or two diametrically opposite coupling slots 43. Selection shaft 36 includes corresponding coupling pins 37 and 38 each of which are receivable into slots 43 to actuate one of the rocking levers according to operation of manual lever 35. Coupling pins 37 and 38 are operably associated with coupling slots 43 and two joints 83 and 88 as described below with particular regard to FIGS. 2, 3 and 6.

Manual lever 35 includes a handle 92. As shown in FIG. 6, handle 92 is locatable at an N position 17, thereby bringing selection shaft 36 to its N position 17, at the intersection of a selection plane 82a—82a, which is transverse to the longitudinal direction of the vehicle, and an adjustment plane 49a—49a, which is located in the longitudinal direction of the vehicle. When the end of manual lever 35 ends in a ball pin 87 which is connected through a joint 88 to a shaft end 90 of a selection shaft 36. This selection shaft is supported to be rotatable and displaceable with respect to its axis 89—89 within gear casing 34. When selection shaft 36 is in this N position, coupling pins 37 and 38 are axially spaced from slots 43 of driving collars 42 and 47 such that the driving collars are uncoupled from selection shaft 36. The rotational axis of coupling pins 37 and 38 is in a selection plane 82—82 (shown in FIG. 4) which is fixed with respect to gear casing 34. At least one coupling pin 37 is inside coupling slot 43 of driving collar 41 of rocking lever 39 which is connected to an external switching rod 93. As shown in FIG. 3, this rod 93 forms part of a linkage connection 21 between range selection member 13 and, through an external switching lever 94, switching device 9. One end of lever 94 is seated in a rotationally fixed manner on a switching shaft 95, which passes into the gear housing 86 of the switching device 9. Thus, according to FIG. 3, when selection shaft 36 is in the N position, switching lever 94 is in N position 66 and transmission of torque through reversing gear 6 is interrupted.

As shown in FIG. 6, handle 92 is movable in adjustment plane 49a—49a "to the front" into R position 16. Selection shaft 36 is thereby rotated clockwise, with respect to the view shown in FIG. 3, such that, as shown in FIG. 3, switching lever 94 is moved into R position 8 in which reversing gear 6 is in its position for reverse motion. Coupling pin 37 remains in an adjustment plane 49-49 (shown in FIG. 2) perpendicular to axis 89—89 of selection shaft 36 during this process, so that driving collars 42 and 47 continue to be uncoupled and do not rotate with selection shaft 36.

When the handle 92 is moved from N position 17 in selection plane 82a—82a to "the left" into an adjustment plane 48a—48a, selection shaft 36 is thereby shifted axially. This axial shift moves coupling pin 38 into an adjustment plane 48—48 and into engagement with coupling slot 43 of driving collar 47 which serves to couple rocking lever 46 with selection shaft 36. Driving collars 41 and 42 are uncoupled from coupling pin 37 and selection shaft 36. As shown in FIG. 3, rocking lever 46 is kinematically connected via parking brake linkage 20 to one end of brake lever 96. The other end of brake lever 96 is rotatably fixed to brake adjusting shaft 10a, which enters gear housing 86. As long as handle 92 is located in selection plane 82a—82a, brake lever 96 is in its disengaged position 11 in which the parking brake, which is located inside gear housing 86 and is indicated in the Figures only by the reference arrow 20, is disengaged. When the handle 92 is moved in adjustment plane 48a—48a "to the front" into P position 15, selection shaft 36 is rotated clockwise with respect to the view shown in FIG. 3. Sice coupling pin 38 remains in adjustment plane 48—48, driving collars 41 and 42 continue to be uncoupled with selection shaft 36 and do not rotate therewith. Since driving collar 47 is coupled with the selection shaft, as selection shaft 36 rotates, braking lever 96 is swivelled into a P position 12 in which parking brake 10 is engaged. Once so engaged, parking brake 10 fixes secondary shaft 68 unrotatably with respect to gear housing 86.

When the handle 92 is moved from N position 17 in selection plane 82a—82a "to the right" into an adjustment plane 44a—44a, selection shaft 36 is axially displaced and coupling pin 37 is shifted into adjustment plane 44—44. In this position driving collars 42 and 47 are uncoupled from selection shaft 36. Driving collar 41 is again coupled with selection shaft 36 since coupling pin 37 has entered slot 43 of that collar. By then moving handle 92 along adjustment plane 44a—44a "to the back" into V position 18, selection shaft 36 is rotated counterclockwise, with respect to the view shown in FIG. 3. This puts switching lever 94 into V position 7 and thus brings reversing gear 6 into the position for forward motion.

When in V position 18, handle 92 is located in a second selection plane 97a—97a, which is also transverse to the longitudinal direction of the vehicle. Thus, the rotational axes of coupling pins 37 and 38 are also in a second selection plane 97—97 (as shown in FIG. 4). By moving handle 92 in second selection plane 97a—97a from V position 18 "to the right" into another adjustment plane 45a—45a, selection shaft 36 is axially displaced and shifted into another adjustment plane 45—45. In this position, coupling pin 37 has entered coupling slot 43 of driving collar 42 of rocking lever 40. However, driving collars 41 and 47 are uncoupled from selection shaft 36. Handle 92 is movable along adjustment plane 97a—97a until it reaches a S position 91 for motor braking operation. This handle position is operably associated through selection shaft 36 with a S position 98 of an external braking control lever 99. This control lever is kinematically connected to rocking lever 40 through a linkage connection 22. Braking control lever 99 is rotatably fixed on a braking control shaft 100 of braking control cam 26, that, via the cam 27, in the S position 98 of braking control lever 99, acts through control part 25 on valve correcting element 73 in such a manner that the gear transmission of gear change 3 can be influenced in the direction of "high" or "low", as will be explained below.

When the manual lever 35 is moved from the V-position into the S-position, the lever arm 28 is lifted far enough off the control cam 80 that the linkage connection 23 is moved into the neutral position by the usual spring force 210.

In this way, the control part 25, on the one side, will be affected by a control moment exercised by the cam 27 in the operating direction 256, this control moment 256 at the valve adjusting element exercising a tensile force acting in the same direction as the biasing means 75. This tensile force tries to bring the control valve 74 into the valve position for high gear transmission that is symbolized by the crossed directional arrows. When the valve 74 is in the position for high gear transmission, the main pressure line 218 is connected in a more or less throttled way with the working pressure line 220 of the control element 4b and the working pressure line 226 of the control element 4a is connected in a more or less throttled way with a return line 222 leading to the torque transmitter 61. The pressure medium in the return line 222 is also used for the lubrication of the torque transmitter 61.

A control pressure line 224 leads to a control cylinder 250, the control piston of which can be acted upon by the control pressure. The control pressure is adjusted in the control pressure line 224 by a centrifugal governor (5), the operation of which will be more fully explained later. The centrifugal governor (5) is fed by the working pressure line 226 and adjusts the control pressure so that it is analogous to the speed $n_{62}$ of the input shaft 62. The control piston causes the control part 25 to generate a control moment acting in the direction of the arrow 258. This control moment 258 results in pressure forces at the valve adjusting element 73 that try to bring the control valve 74 into the valve position for low gear transmission that is symbolized by the parallel opposite directional arrows. As a result, the main pressure line in a more or less throttled way is connected with the working pressure line 226 of the control element 4a and the return line in a more or less throttled way is connected with the working pressure line 220 of the control cylinder 4b so that the gear transmission would be influenced in the sense of "low".

On the basis of these opposing forces at the valve adjusting element 73, the control valve 74, while in the S-position of the manual lever 35, tries to balance itself in its central position in which all four valve connections are connected with one another so that the gear transmission is about 1:1.

When the vehicle reaches a downgrade and is therefore accelerated under the influence of gravity, the speed $n_{62}$ of the input shaft 62 increases, so that the control force at the control cylinder 250 predominates and moves the control valve 74 in the direction of its parallel arrows position in orier to affect the gear transmission in the sense of low high that the engine is driven relatively slowly and its braking performance is therefore low.

When in the S-position of the manual lever 35, the engine braking effect is still too weak, by actuating the manual lever 35 in the direction if its L-position 19, the control moment at the control part 25 acting in the direction of the arrow 256 and this the tensile forces affecting the valve adjusting element 73 in the direction of "high" is increased. Thus, the control valve 74 is brought into its crossed arrows position in order to increase the gear transmission. Analogously, the engine will then be driven increasingly faster with the same vehicle speed so that its braking performance increases.

When handle 92 is moved along adjustment plane 45a—45a from S position 91 "to the front" into L position 19, selection shaft 36 is rotated clockwise with respect to the view of FIG. 3. Coupling pin 37 remains in the correcting adjustment plane 45—45 and driving collars 41 and 47 continue to be uncoupled and non-rotatable with respect to selection shaft 32. This causes braking control lever 99 to be swivelled in the direction of an L position 19, thus increasing the gear transmission to "high" via cam 27 and control part 25.

As seen in FIG. 1, the two loose pulleys 69 and 71 are respectively connected with the axially slidable cylinders 70 and 72, whereas the two pertaining axially stationary pistons are connected with the corresponding shaft 62 and 68. A control cam 236 is connected with cylinder 70 and therefore, the loose pulley 69. This control cam 236 acts through an intermediate lever drive 262 on the control linkage 246 such that when the cylinder 70 is adjusted in the direction of "low", the regulating valve 74 in influenced in the direction of "high", by linkage 246 acting on control linkage 25 and valve adjusting element 73.

The control linkage 25 provides an influencing of the regulating valve 74 that is dependent on the engine torque. This is because the flap valve 230, which is connected to the control pressure line 222 that is connected to the torque generator assembly 61, causes the control linkage 246 to be moved in the "high" or "low" direction due to the increases and decreases in pressure in the control pressure line 22 generated by the assembly 61.

As shown in FIG. 7, the centrifugal governor (5) with its governor housing 5.1 is disposed so that it rotates with respect to the axis of rotation 5.2—5.2 of the shaft 62 (compare FIG. 1). The governor housing 5.1 has a housing bore 5.3 that is located radially with respect to the axis of rotation 5.2—5.2 and is graduated in its diameter, for a corespondingly graduated governor sleeve 5.4 operating as a centrifugal weight. The governor sleeve 5.4, with a radial play, is penetrated by a bolt-shaped second centrifugal weight 5.6 that, at its ends, with one collar 5.61 and 5.62 respectively, is sealed off in the two sections of the housing bore 5.3 and is guided in an axially slidable way. Between the centrifugal weight 5.6 and the governor sleeve 5.4 used as a centrifugal weight, a pressure spring 5.7 is inserted that is subjected to a certain prestressing. This pressure spring 5.7 braces the two centrifugal weights with respect to one another in such a way that their stop faces 5.8 and 5.9, in the case of low pressure values rising from zero, are placed against one another and both centrifugal weights 5.4 and 5.6 operate as one single centrifugal weight.

Two governor connections 5.11 and 5.12 that are displaced with respect to one another in the direction of the bore axis 5.13—5.13 lead into the wide section of the governor bore, while a third governor connection 5.10 leads into the narrow section of the housing bore 5.3. The governor connection 5.10 is connected to the working pressure line 226 seen in FIG. 1. In contrast, the governor connection 5.11 is connected with the control pressure line 224, while the governor connection 5.12 is essentially balanced to zero.

Also balanced to zero are the two front-side ends of the housing bore 5.3 as well as the space enclosed by the two centrifugal weights 5.4, 5.6 and the governor housing 5.1. This space is ventilated to the outside through the bores 5.63 in the centrifugal weight 5.6. The housing bore 5.3 and the governor sleeve 5.4 in the area of their respective diameter graduations, are respectively equipped with cone-shaped guiding edges 5.31 and 5.41. The result of its diameter graduation at the regulator sleeve 5.4 is a ring-shaped piston pressure surface 5.5, at which a centripetal pressure force is created that takes place in the opposite direction with respect to centrifugal force and spring force. The spring outside end of the housing bore 5.3 has a projection that is used as a stop for the centrifugal weight 5.6.

The method of operation of the centrifugal governor is as follows: When the shaft 62 stands still—thus, when the centrifugal force is equal to zero—, the two centrifugal weights 5.4 and 5.6 are mutually in stopping position and are jointly in a radially inside position in the housing bore 5.3 in such a way that the governor connections 5.10, 5.11 and 5.12 are blocked so that the control pressure line 224 is balanced to zero.

When the rotational speed of the shaft 62 rises from zero, both centrifugal weights 5.4 and 5.6 as a unit move radially to the outside so that a more or less throttled connection is established to the governor connection 5.11 via the guiding edges 5.31 and 5.41 by opening the governor connection 5.10. In this case, at the governor sleeve 5.4, the control pressure force resulting from the control pressure of the governor connection 5.11 at the piston pressure surface 5.5 continuously acts against the centrifugal forces. In this lower rotational speed range, the control pressure of the control pressure line 224—because both centrifugal weights 5.4 and 5.6 are operative—rises relatively steeply above the rotational speed of the shaft 62. The displacement of the control cylinder 250 assures flow for the throttled connection described.

Should, in this quiescent state, the centrifugal weight arrangement 5.4-5.6 be caused to carry out a movement which is directed radially toward the outside as a result of gravity or any other influences, the valve connection 5.10 of the working pressure line 226 is opened up instantaneously, so that, at the differential pressure surface 5.5, as a result of the unpressurized condition at the valve connection 5.11 of the control pressure line 224, a centripetally directed pressure force occurs, which moves the centrifugal weight arrangement 5.4-5.6 back into the last-described radially inside position.

Reference is also made to U.S. Pat. No. 3,893,344 to Dantigraber, et al. for disclosure of a centrifugal governor arrangement of the type which could be adapted for use in practicing the present invention.

When the rotational speed of the shaft 62 continues to rise, so that the centrifugal force of the centrifugal weight 5.6 rises and exceeds the prestressing force of the pressure spring 5.7, the centrifugal weight 5.6 moves radially to the outside into a stop position at the projection 5.32. The centrifugtal weight 5.6 compresses the pressure spring 5.7, while the governor sleeve 5.4 stays in the lift area of the guiding edge 5.31 due to the control pressure force at the ring surface 5.5 of the sleeve. As a result, the centrifugal force of the centrifugal weight 5.6 is disconnected from the governor sleeve 5.4 so that the sleeve 5.4 operates alone as a centrifugal weight, causing the control pressure in the control pressure line 224, from this moment on, to rise less steeply above the rotational speed of the shaft 62.

In order to prevent the two rocking levers, or their associated linkages, which are in each shift position not coupled to selection shaft 36 from being unintentionally actuated or adjusted, a catch 29 working in conjunction with locking cams 30, 31, 32 and 33, are provided by the present invention. The construction and operation of these catch and cam elements are described below.

Latching bolt 50 is, for example, used as catch 29. The axis of bolt 50 is aligned parallel to axis 89—89 of selection shaft 36. Bolt 50 is mounted so as to be axially displaceable in gear casing 34 and is connected to selection shaft 36 by an eccentric disc 102. This disc is movably secured with respect to selection shaft 36 and engages a lateral carrier slot 103 of latching bolt 50. This connection of disc 102 and bolt 50 is designed in such a manner that, with movements of selection shaft 36 along axis 89—89, latching bolt 50 is motionally fixed with respect to selection shaft 36 while, with rotating movements of selection shaft 36, bolt 50 is motionally fixed with respect to gear casing 34. Cams 30 and 31, 32, and 33 are formed as radial projections of driving collars 41, 42 and 47, respectively. Cams 30 to 33 achieve their blocking function by engagement with bolt 50. In the vicinity of both coupling pins 37 and 38, bolt 50 is provided with lateral slot-shaped openings 51 and 52,, respectively, which permit disengagement of blocking cams 30 to 33 from bolt 50.

In the blocking operation diagram of FIG. 5, the vertical columns indicate the operational relationship of blocking cams 30 to 33 both with the driving collars and with openings 51 and 52 and the blocking condition in the individual adjustment planes of the selection shaft. As shown therein, at driving collar 41 of rocking lever 39, blocking cams 30 and 31 are provided which are mutually offset both in the peripheral direction and axially. Blocking cam 30 is used for blocking R position 8, and blocking cam 31 is used for blocking V position 7 in each case of switching lever 94 and switching device 9, respectively. Blocking cam 32 is provided at driving collar 42 of rocking lever 40 for the motor braking operation. Blocking cam 33 is provided at driving collar 47 of rocking lever 46 for applying the parking brake.

For the selection shaft-driving collar arrangement corresponding to column (48)—(48) in FIG. 5, only blocking cam 33 can enter its associated opening 52 where coupling pin 38 is at adjustment plane 48—48 of selection shaft 36. Opening 51 is located axially outside the motion paths of its associated blocking cams 30 to 32. Thus, in this position parking lock 10 (braking adjustment for shaft 10a) can be engaged, but braking control linkage 26 and switching device 9 are blocked.

For the arrangement corresponding to column (49)—(49) in FIG. 5, where coupling pin 37 is in adjustment plane 49—49 of selection shaft 36, only blocking cam 30 of driving collar 41 can enter its associated opening 51. Thus, only switching device 9 can be operated, and then only into R position 8. Operation of parking brake 10 and braking control linkage 26 are prevented.

For the arrangement corresponding to column (44)—(44) in FIG. 5, where coupling pin 37 is in adjustment plane 44—44 of selection shaft 36, only blocking cam 31 can enter its associated opening 51. Again, only switching device 9 can be operated, but now only into V position 7. Operation of parking brake 10 and braking control rod 26 are again prevented.

Finally, for the arrangement according to column (45)—(45) in FIG. 5, where coupling pin 37 is in adjustment plane 45—45 of selection shaft 36, both blocking cam 31 of driving collar 41 and blocking cam 32 are in the axial area of associated opening 51. Thus, it has become possible to operate braking control cam 26 while in V position 7 of the switching device, but operation of its R position 8 and parking brake 10 are prevented.

Referring now to FIGS. 2, 4 and 6; it will be seen that braking control cam 26 can be operated only if reversing gear 6 or its switching device 9 are in V position 7. Constructionally, this is ensured by providing a thin blocking disc 53 on selection shaft 36. Disc 53 is provided with a passage 54, which is centrally located with respect to selection shaft 36. Disc 53 is axially located between driving collars 41 and 42. In order to fix blocking disc 53 so as to be unrotatable with respect to gear casing 34 along axis 89—89 of selection shaft 36, latching bolt 50 is arranged to be movable through a fixing slot 105 formed by a forked eccentric section 104 on disc 53. Section 104 overlaps blocking bolt 50 to such an extent that blocking disc 53 remains unrotatably fixed even if blocking disc 53 axially covers opening 51. Blocking disc 53 is also provided with radial openings 55 and 56, which originate from passage 54, for the axial passage of coupling pin 37. Openings 55 and 56 are centrally located with respect to second selection plane 97—97 for the transition of selection shaft 36 between adjustment planes 44—44 and 45—45, like coupling slot 43 of driving collar 42. In this manner, coupling pin 37 can change between coupling slots 43 of driving collars 41 and 42 only when coupling slot 43 of driving collars 41 has been brought into second selection plane 97—97 and, thus, reversing gear 6 is in V position 7.

Referring back to FIG. 1, a pressure switch 248 connected to the control pressure line 224 is provided that is shut off by spring force and only when the vehicle is not moving. This pressure switch 248 is located in the control circuit 252 of the 3/2-way switch-off valve 260.

The switch-off valve 260, when the vehicle is not moving and therefore also when the position switch 242 is shut because of the released clutch 58, disconnects the working pressure line 226 from the control valve 74, so that a connection is established between the oil sump 238 of the gear 3 and the working pressure line 226.

As a result, a control stage designates as "vehicle stoppage" is switched in which the working pressure line 220 is positively connected with the main pressure line 218 because the control pressure line 224 is without pressure and as a result the control valve 74 is either in its central position or in its position for the influencing of the gear transmission to "high". As a result, for starting from the stopped position, the highest transmission is available, and also after a traffic light stop, after the vehicle had been braked at a high speed and therefore with a low gear transmission.

The feeding pressure in the main pressure line 218 is limited by a flap valve 230. This valve 230 is itself controlled by a control cam in the form of a shaft collar 236 which interacts with control rod system 246, as described below.

The preload valve 230 in the neutral center position of the control valve 74, maintains a preload pressure that is determined by the spring preload of the valve spring affecting the valve ball in the return line 222 and thus in both adjusting elements 4a and 4b.

If the controlling action of the control valve 74 is affected in the sense of "high", i.e., in the sense of a change of the transmission ratio that results in a rise of the engine speed, the spring force of the preload valve 230 is increased by means of the back-coupling control rod system 246, and thus counteracts a pressure reduction in the adjusting element 4a that in this case is switched to the return line 222 by means of the control valve 74. An increasing throttling of the return line 222 with respect to the control element 4a is also adjusted by means of the torque signal generator assembly 61 for an increasing engine torque, so that the chain pressing force of the conical disks 63 by means of the pressure in the adjusting element 4a is adapted to the rise in torque.

The torque sensor 61 causes a corresponding adaptation of the chain pressing force of the conical disks 64 when the control valve 74 is affected in the sense of "low", i.e., in the sense of a change of the gear ratio that leads to a lowering of the engine speed and as a result has switched the control element 4b to the return line 222.

A secondary pump 240 that is driven by output shaft 68 when the primary pump 67 is inoperative, feeds pressure into the main pressure line 218. This will occur when the vehicle is being towed, for instance.

A return line 234 leads from the pressure regulator valve 244 out above the primary disk pair 63 for lubricating purposes. Similarly, line part 232, leading from the torque signal generator assembly 61 is used for the lubrication of the secondary disk pair 64, and for this purpose, leads out at a point above the disk pair 64 free in the gear case.

Via the return line 222 and line 232, the control element 4b is also switched to the oil sump 238 when the control valve 74 is in the low gear transmission position.

From the preceding description of the preferred embodiment, it is evident that the objects of the invention are attained and although the invention has been described and illustrated in detail, it is to be clearly understood that the same is by way of illustration and example only and is not to be taken by way of limitation. The spirit and scope of the present invention are to be limited only by the terms of the appended claims.

What is claimed:

1. Control apparatus for controlling a motor vehicle drive assembly of the type having:
   motor braking means for operatively engaging the motor of the drive assembly to apply braking forces to the drive assembly, and gear switching means for switching gear change means between forward, neutral and reverse gears, said control apparatus comprising:
   a manually operable selection element;
   first mechanical linkage means for operatively connecting said selection element and said motor braking means;
   second mechanical linkage means for operatively connecting said selection element and said gear switching means; and
   a gear casing;
   said selection element controlling said motor braking means and said gear switching means through said first and second mechanical linkage means respectively;
   said drive assembly having a power adjustment element for a power control of the drive assembly, and said apparatus further comprising third mechanical linkage means for operatively connecting said adjustment element and said motor braking means;
   said third mechanical linkage means including a detachable coupling and a lever arm coupling part, said coupling being detached by said first mechanical linkage means when said motor braking means is acutated through said first mechanical linkage means;

said first mechanical linkage means varying the transmission ratio between the rotational output speed and the rotational input speed of the gear change means comprising a continuously variable gear change between a higher ratio and a lower ratio;

said manually operable selection element being able to assume: a V position to select the forward gear; an R position to select the reverse gear; an N position to select neutral; an S position to select the higher ratio of the gear change; an L position to select the lower ratio of the gear change; and a P position for applying a parking brake:

said first and second mechanical linkages having a selection adjustment shaft, which is linked to said manually operable selection element, supported in a rotatable and axially displaceable manner relative to the gear casing and provided with at least one radial coupling pin, which is motionally fixed with respect to said shaft, and wherein on said selection adjustment shaft a rocking lever, which is connected to a switching device of said gear switching means and a rocking lever which is connected to said first mechanical linkage means for the motor bra-king operation,, are supported, with driving collars to be rotatable about said selection adjustment shaft; and wherein said driving collars are provided with corresponding coupling slots and arranged with respect to the gear casing to be axially undisplaceable in such a manner that said selection adjustment shaft can be shifted between two adjustment planes, which are normal to the axis of rotation of the selection adjustment shaft, with alternating engagement of said two driving collars with said coupling pin.

2. Control apparatus according to claim 1, further comprising preventing means for preventing operative connection of said selection element and said motor braking means unless said forward gear is engaged.

3. Control apparatus according to claim 1, further comprising a catch means for preventing said manually operable selection element from assuming said R position when braking forces are applied.

4. Control apparatus according to claim 1, further comprising preventing means for preventing said manually operable selection element from directly assuming said V position when said manually operable selection element is in said R position.

5. Control apparatus according to claim 1, further including a plurality of catch means for mechanically blocking movement of said second mechanical linkage means from said gear switching means when said selection element is in the P position.

6. Control apparatus according to claim 1, further comprising catch means for preventing actuation of said first mechanical linkage means when said manually operable selection element is in a position other than between said S and L positions.

7. Control apparatus according to claim 1, wherein said vehicle has a parking brake linkage connected between said manually operable selection element and a parking brake of the motor vehicle, said apparatus further comprising catch means for mechanically blocking said manually operable selection element from actuating said parking brake linkage to engage said parking brake.

8. Control apparatus for controlling a motor vehicle drive assembly of the type having:

motor braking means for operatively engaging the motor of the drive assembly to apply braking forces to the drive assembly, and gear switching means for switching gear change means between forward, neutral and reverse gears, said control apparatus comprising:

a manually operable selection element;

first mechanical linkage means for operatively connecting said selection element and said motor braking means;

second mechanical linkage means for operatively connecting said selection element and said gear switching means; and a gear casing;

said selection element controlling said motor braking means and said gear switching means through said first and second mechanical linkage means respectively;

said drive assembly having a power adjustment element for a power control of the drive assembly, and said apparatus further comprising third mechanical linkage means for operatively connecting said adjustment element and said motor braking means;

said third mechanical linkage means including a detachable coupling and a lever arm coupling part, said coupling being detached by said first mechanical linkage means when said motor braking means is actuated said first mechanical linkage means;

said first mechanical linkage means varying the transmission ratio between the rotational output speed and the rotational input speed of said gear change means comprising continuously variable gear change between a higher ratio and a lower ratio;

said manually operable selection element being able to assume: a V position to select the forward gear; an R position to select the reverse gear; an N position to select neutral; an S position to select the higher ratio of the gear change; and L position to select the lower ratio of the gear change; and a P position for applying a parking brake;

said first and second mechanical linkage means including a selection adjustment shaft, said selection adjustment shaft supporting a rocking lever connected to a parking brake linkage and comprising a driving collar thereof to, said selection adjustment shaft being rotatable and axially displaceable relative to the gear casing; and wherein said driving collar, which is provided with a corresponding coupling slot, for coupling with coupling means on said selection adjustment shaft being arranged to be axially undisplaceable with respect to the gear casing in such a manner that said selection adjustment shaft can be shifted into a parking adjustment plane, which is normal to the axis of rotation and in which exclusively said driving collar of said rocking lever connected to said parking brake linkage is coupled to said selection adjustment shaft.

9. Control apparatus for controlling a motor vehicle drive assembly of the type having:

motor braking means for operatively engaging the motor of the drive assembly to apply braking forces to the drive assembly, and gear switching means for switching gear change means between forward, neutral and reverse gears, said control apparatus comprising:

a manually operable selection element;

first mechanical linkage means for operatively connecting said selection element and said motor braking means;

second mechanical linkage means for operatively connecting said selection element and said gear switching means; and a gear casing;

said selection element controlling said motor braking means and said gear switching means through said first and second mechanical linkage means respectively;

said drive assembly having a power adjustment element for a power control of the drive assembly, and said apparatus further comprising third mechanical linkage means for operatively connecting said adjustment element and said motor braking means;

said third mechanical linkage means including a detachable coupling and a lever arm coupling part, said coupling being detached by said first mechanical linkage means when said motor braking means is actuated through said first mechanical linkage means;

said first mechanical linkage means varying the transmission ratio between the rotational output speed and the rotational input speed of the gear change means comprising a continuously variable gear change between a higher ratio and a lower ratio;

said manually operable selection element being able to assume: a V position to select the forward gear; an R position to select the reverse gear; an N position to select neutral; an S position to select the higher ratio of the gear change; an L position to select the lower ratio of the gear change; and a P position for applying a parking brake;

said first mechanical linkage means including a selection adjustment shaft which can be shifted from a first adjustment plane for the engagement of a first rocking lever connected to a switching device of the gear switching means and, while maintaining its link with this rocking lever, into a second adjustment plane in which two other rocking levers are uncoupled and wherein said first and second adjustment planes are shifted from alternately.

10. Control apparatus for controlling a motor vehicle drive assembly of the type having:

motor braking means for operatively engaging the motor of the drive assembly to apply braking forces to the drive assembly, and gear switching means for switching gear change means between forward, neutral and reverse gears, said control apparatus comprising:

a manually operable selection element;

first mechanical linkage means for operatively connecting said selection element and said motor braking means;

second mechanical linkage means for operatively connecting said selection element and said gear switching means; and a gear casing;

said selection element controlling said motor braking means and said gear switching means through said first and second mechanical linkage means respectively;

said drive assembly having a power adjustment element for a power control of the drive assembly, and said apparatus further comprising third mechanical linkage means for operatively connecting said adjustment element and said motor braking means;

said third mechanical linkage means including a detachable coupling and a lever arm coupling part, said coupling being detached by said first mechanical linkage means when said motor braking means is actuated through said first mechanical linkage means;

said first mechanical linkage means varying the transmission ratio between the rotational output speed and the rotational input speed of the gear change means comprising a continuously variable gear change between a higher ratio and a lower ratio;

said manually operable selection element being able to assume: a V position to select the forward gear; an R position to select the reverse gear; an N position to select neutral; an S position to select the higher ratio of the gear change; an L position to select the lower ratio of the gear change; and a P position for applying a parking brake;

said first and second mechanical linkage means including a latching bolt, which is supported parallel to a selection adjustment shaft axially displaceable in the gear casing, which is connected in a motionally fixed manner with respect to its axial directions to said adjustment shaft, and which is provided with recesses, which recess are located in the axial area of a plurality of driving collars coupled to a respective plurality of rocking levers forming part of the first and second mechanical linkage means, for the disengagement of radial blocking cams which are used as catch means, one said blocking cam being arranged motionally fixed at the driving collar of each of the respective levers rocking levers in such a manner that, when a coupling pin on the adjustment shaft enters a coupling slot of one of said driving collars, the blocking cam of the corresponding driving collar reaches the area of a recess.

* * * * *